(12) United States Patent
Neubrand et al.

(10) Patent No.: US 6,386,615 B2
(45) Date of Patent: May 14, 2002

(54) TONNEAU COVER SYSTEM

(75) Inventors: Frank G. Neubrand, West Bloomfield; Raymond W. Ninness, Eastpointe, both of MI (US)

(73) Assignee: CTS Fahrzeug Dachsysteme GmbH, Rochester Hills, MI (US)

( * ) Notice: Subject to any disclaimer, the term of this patent is extended or adjusted under 35 U.S.C. 154(b) by 0 days.

(21) Appl. No.: 09/779,727

(22) Filed: Feb. 8, 2001

Related U.S. Application Data

(63) Continuation-in-part of application No. 09/334,763, filed on Jun. 16, 1999, now Pat. No. 6,217,104.

(51) Int. Cl.[7] .................................................. B60J 7/20
(52) U.S. Cl. ...................... 296/76; 296/107.08; 296/136
(58) Field of Search .......................... 296/107.08, 136, 296/76

(56) References Cited

U.S. PATENT DOCUMENTS

| | | | |
|---|---|---|---|
| 2,800,361 A | * 7/1957 | Kubacks ............ 296/107.08 X |
| 3,180,677 A | 4/1965 | Scott |
| 4,487,447 A | 12/1984 | Schroder |
| 4,553,784 A | 11/1985 | Trenkler |
| 4,799,729 A | 1/1989 | Muscat |
| 4,895,409 A | 1/1990 | Konishi et al. |
| 5,064,241 A | 11/1991 | Ohrle |
| 5,067,768 A | 11/1991 | Fischbach |
| 5,078,447 A | 1/1992 | Klein et al. |
| 5,100,195 A | 3/1992 | Patel |
| 5,209,544 A | * 5/1993 | Benedetto et al. ...... 296/136 X |
| 5,219,200 A | 6/1993 | Orth et al. |
| 5,322,337 A | 6/1994 | Rawlings et al. |
| 5,445,429 A | 8/1995 | Koehler et al. |
| 5,533,777 A | 7/1996 | Kleemann et al. |
| 5,558,388 A | 9/1996 | Furst et al. |
| 5,593,202 A | 1/1997 | Corder et al. |
| 5,620,226 A | 4/1997 | Sautter, Jr. |
| 5,622,382 A | 4/1997 | Zepnik et al. |
| 5,641,193 A | 6/1997 | Zepnik et al. |
| 5,671,947 A | 9/1997 | Henn |
| 5,769,483 A | 6/1998 | Danzl et al. |
| 5,775,766 A | 7/1998 | Schaible et al. |
| 5,785,375 A | 7/1998 | Alexander et al. |
| 5,823,606 A | 10/1998 | Schenk et al. |
| 5,881,458 A | 3/1999 | Wolf et al. |
| 6,039,382 A | 3/2000 | Mather et al. |
| 6,254,165 B1 | * 7/2001 | Neubrand .................... 296/76 |

FOREIGN PATENT DOCUMENTS

| | | |
|---|---|---|
| DE | 197 06 397 C1 | 6/1998 |
| DE | 197 37 970 A1 | 3/1999 |
| DE | 199 10 763 C1 | 7/2000 |
| DE | 199 49 960 A1 | 4/2001 |
| EP | 826 537 A1 | 3/1998 |
| EP | 0 949 103 A1 | 10/1999 |

* cited by examiner

*Primary Examiner*—Dennis H. Pedder
(74) *Attorney, Agent, or Firm*—Brooks & Kushman, P.C.

(57) ABSTRACT

Apparatus for covering a retractable top for a motor vehicle, comprises a decklid and a tonneau cover. The decklid is attached to the vehicle, and is at least partially defining an opening through which the top may retract. The tonneau cover is slidably secured to the decklid to open and close the opening.

20 Claims, 2 Drawing Sheets

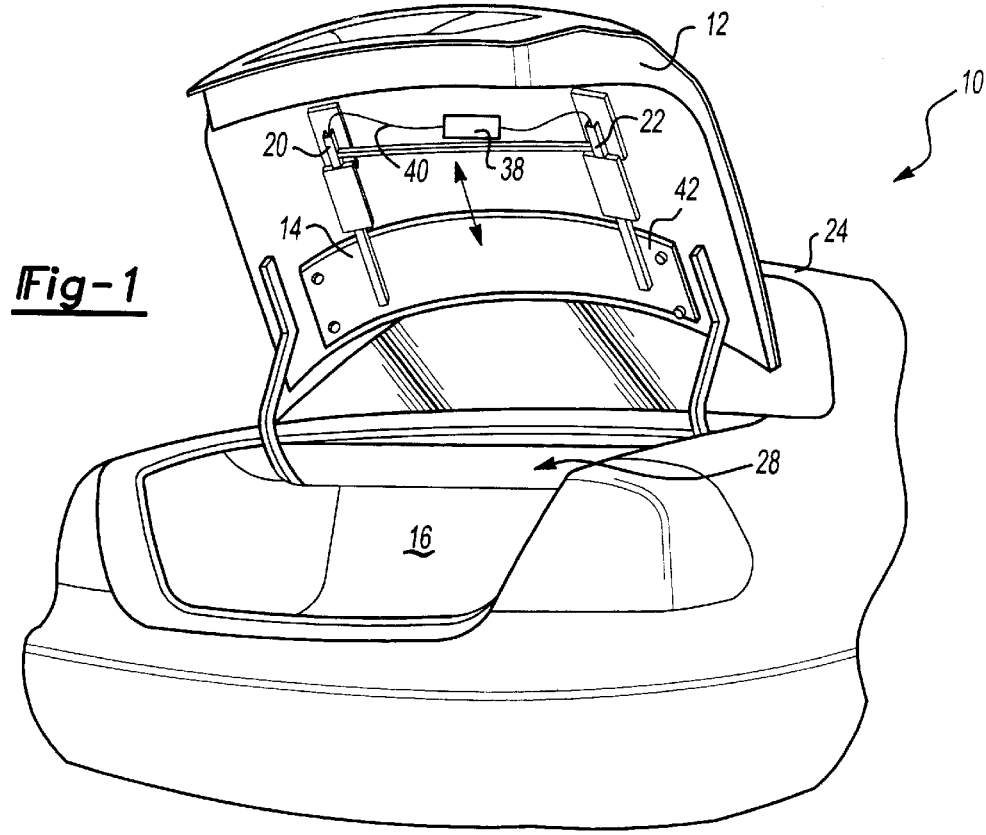
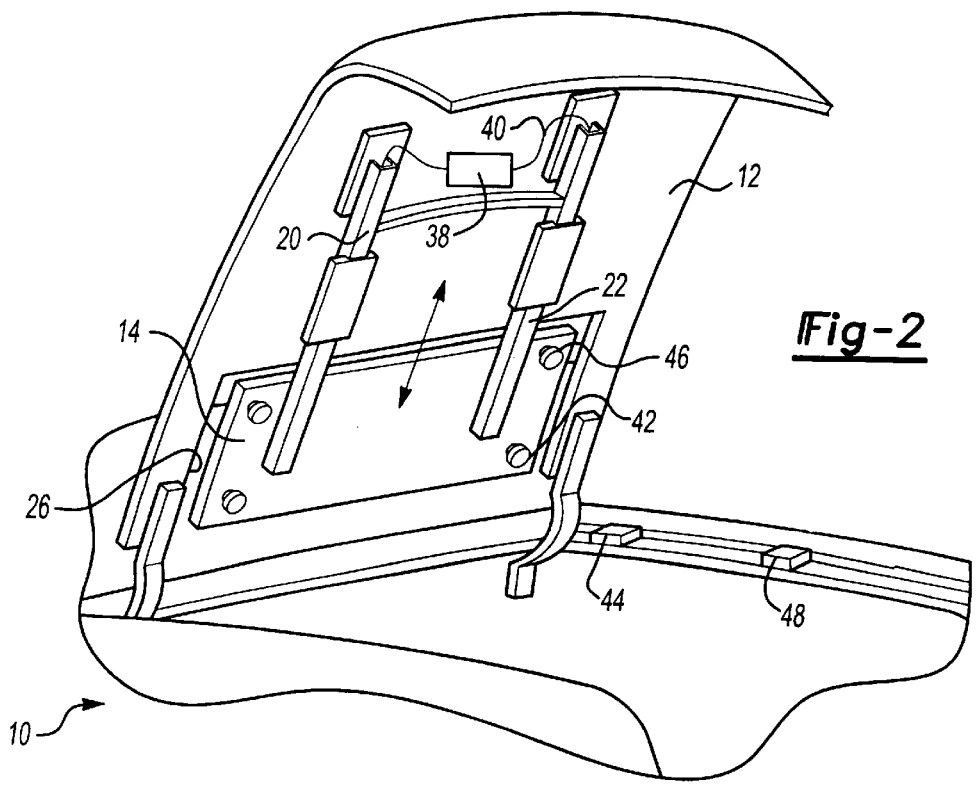

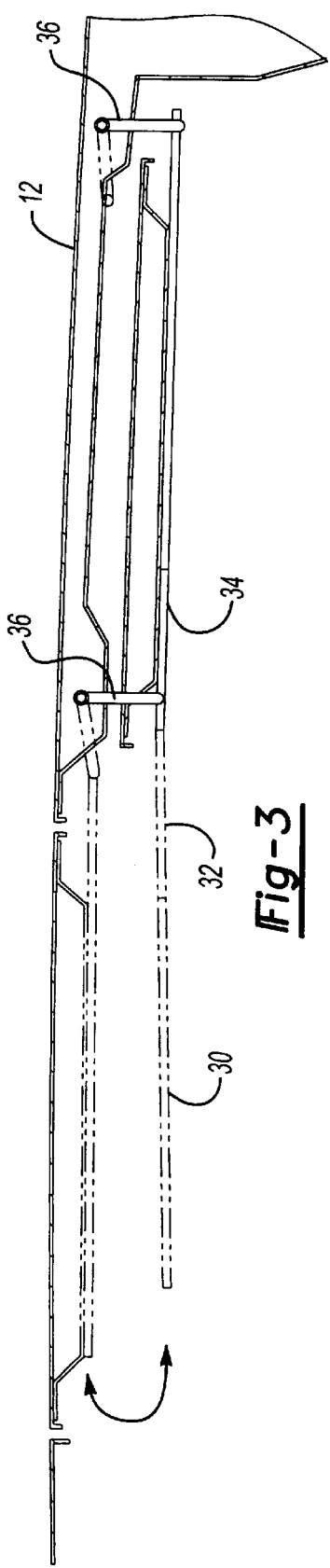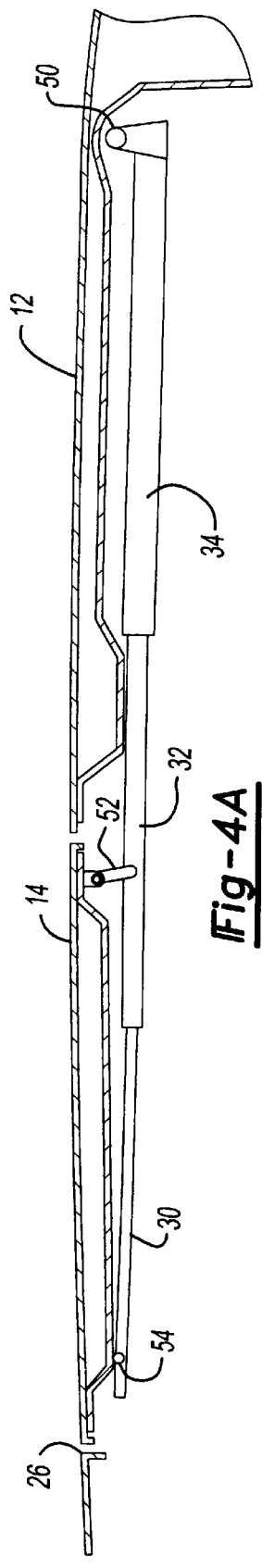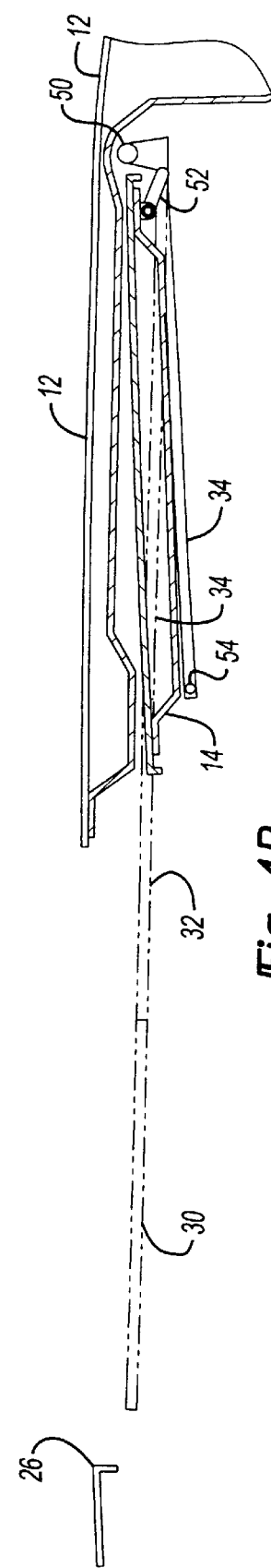

TONNEAU COVER SYSTEM

CROSS REFERENCE TO RELATED APPLICATIONS

This application is a continuation-in-part of U.S. application Ser. No. 09/334,763, filed Jun. 16, 1999, now U.S. Pat. No. 6,217,104 the disclosure of which is hereby incorporated by reference.

TECHNICAL FIELD

This invention relates to retractable hard top vehicle roofs.

BACKGROUND ART

Motor vehicles generally are provided with a rigid roof structure completely enclosing the top of the passenger compartment. In some instances a sunroof may be provided at an additional cost to provide some overhead ventilation, however, the size of the vehicle sunroofs is normally very limited. Vehicle roofs with sunroofs do not in any way approach the ventilation, openness and panoramic view that is available with a convertible roof.

Conventional convertibles have a soft top that is folded into a series of folds that are stretched over three or four convertible top bows when the top is in its extended, or up, position. Convertible soft tops are prone to problems including excessive noise and potential water leakage. Soft tops are also generally less durable than a hard top and may require replacement periodically during the life of the vehicle. Some of the difficulties with the soft top convertibles result from the fact that they are not particularly well suited to winter weather. Cold temperatures, ice and snow that are encountered in winter discourage consumers from selecting convertible style vehicles even though the consumers may want a convertible for summer driving. In winter, water leakage through the convertible roof can make driving unpleasant and cause water damage to the interior of the vehicle. A soft top can make a vehicle difficult to heat due to heat transfer through the convertible top unless it is lined and insulated. If a convertible top is lined and insulated, reduction in noise levels and better heat retention may be achieved but the top becomes more bulky and requires more space within the vehicle for stowage.

Retractable hard tops offer the advantages of a hard top roof and a convertible in that they provide a durable vehicle roof that is not prone to excessive noise levels or leakage and provides excellent durability. Tonneau covers are used to cover a storage well for a retractable roof. Tonneau covers are provided for aesthetic purposes and to improve aerodynamics.

One problem with manual tonneau covers is that they must be manually attached over the storage well for the retractable top. Manual tonneau covers take time to install, and as a result many owners do not install the tonneau cover, which adversely impacts aesthetics and aerodynamics of a vehicle. Power tonneau systems are known that are either incorporated as part of the top stack or are secured to the retractable top storage well. In these types of systems, the tonneau cover pivots vertically upwardly to provide clearance for raising and lowering of the convertible top or retractable hardtop. This approach may require a complex linkage and careful coordination with the top stack operating mechanism. Including the tonneau as part of the top stack or as part of the storage well creates problems relating to storing the tonneau cover when it is not covering the storage well.

Another problem with prior art tonneau covers relates to restraining the tonneau cover when the tonneau cover is in its storage position, not covering the convertible top storage well. If the tonneau cover is not locked in place, it may vibrate and cause unwanted noise.

Vehicles having a tonneau cover that is retracted under the decklid and a convergent rear end may not have sufficient space under the decklid and next to the tonneau to allow a track to be mounted parallel to the direction of movement of the tonneau cover.

These and other problems are addressed by applicant's invention as summarized below.

DISCLOSURE OF INVENTION

The present invention is an apparatus for covering a retractable top for a motor vehicle. The apparatus comprises a decklid and a tonneau cover. The decklid is attached to the vehicle, and at least partially defining an opening through which the top may retract. The tonneau cover is slidably secured to the decklid to open and close the opening.

These and other features and aspects of the invention will be better understood in view of the attached drawings and in light of the following detailed description of the best mode for practicing the invention.

BRIEF DESCRIPTION OF DRAWINGS

FIGS. 1 and 2 are rear perspective views of a vehicle having a tonneau cover according to the present invention;

FIG. 3 is a side view showing one embodiment of the tonneau cover; and

FIGS. 4A and 4B are side views showing an alternative embodiment of the tonneau cover system at different points in a cycle between a forward position covering the convertible top storage well and a stowed position wherein the tonneau cover is disposed below a decklid.

BEST MODE FOR CARRYING OUT THE INVENTION

FIGS. 1 through 3 show a vehicle 10 having a decklid 12 and a tonneau cover 14. The tonneau cover 14 is located behind a rear seat 16 of the vehicle 10, and is slidably secured to the decklid 12 by a plurality of driver's side tracks 20 and passenger's side tracks 22. As described below, the tracks 20 and 22 retract to position the tonneau cover 14 under the decklid 12 when the convertible top or retractable hardtop 24 is being raised or lowered through an opening 26 defined in the decklid. The tracks 20 and 22 likewise extend to position the tonneau cover 14 in the opening 26 and over a storage well 28 in which a top 24 may be stored.

The tracks 20 and 22 are connected to the decklid 12. In a preferred embodiment shown in FIG. 3, the tracks 20 and 22 each include segments 30, 32 and 34, with the segments 34 each secured to the decklid by a pair of links 36. The segments 30 and 32 are slidably nested in the segments 34 in a fashion similar to drawer slides, and may for this purpose be provided with ball bearings or the like to facilitate relative translation. A drive system including an electric motor 38 and a drive cable 40 moves the tracks 20 and 22 and the tonneau cover 14 when the decklid 12 is open. It should be appreciated, of course, that other drive systems such as the those using hydraulic cylinders are equally adaptable to the present invention.

The tonneau cover 14 has a first position for covering the storage well 28 when the decklid is closed, and a second position suspended in the opening 26 after the decklid is opened. As the tonneau cover 14 is extended into the opening 26, the links 36 rotate clockwise as shown in FIG. 3. When the decklid 12 is thereafter closed, bumper stops 42 proximate the leading edge of the tonneau cover abut receptors 44 mounted proximate the edges of the trunk of the vehicle. Similar bumper stops 46 mounted proximate the trailing edge of the tonneau cover abut receptors 48 in the trunk. When the decklid is fully closed, the tonneau cover is thereby lifted into position substantially flush with the upper surface of the decklid. The bumper stops 42 and 46 may be formed as adjustable elastomeric screws or the like to allow the height to which the tonneau cover is raised to be varied.

FIGS. 4A and 4B show an alternative embodiment of the present invention. In this embodiment, the nested segments 30, 32, and 34 are secured to the decklid by a rear pivot 50, while the tonneau cover 14 is attached to the track segments 30 by flipper link 52. The front end of track 30 is connected by a pivot 54 to the tonneau cover 14. After the tonneau cover 14 is extended into the opening 26 and as the decklid 12 is thereafter closed, the flipper link 52 rotates clockwise as shown as the bumper stops 42 and 46 respectively come into contact with receptors 44 and 48. When the decklid is fully closed, the tonneau cover is thereby lifted into position substantially flush with the upper surface of the decklid. It should be noted that in either embodiment of the present invention, the receptors may be provided with ramps to facilitate engagement with the bumper stops.

While embodiments of the invention have been illustrated and described, they are not intended to illustrate and describe all possible forms of the invention. Rather, the words used in the specification are words of description rather than limitation, and it is understood that various changes may be made without departing from the spirit and scope of the invention. Finally, application Ser. Nos. 09/535,601 and 09/639,958 U.S. Pat. Nos. 6,318,792 and 6,254,165, respectively, are related to the present invention, and their disclosures are hereby incorporated by reference.

What is claimed is:

1. Apparatus for covering a retractable top for a motor vehicle, comprising:
   a decklid attached to the vehicle, the decklid at least partially defining an opening through which the top may retract;
   a tonneau cover slidably secured to the decklid to open and close the opening.

2. The apparatus of claim 1 wherein the tonneau cover is secured to the decklid by a plurality of tracks that are extendable across a portion of the opening.

3. The apparatus of claim 2 wherein the tonneau cover is pivotally connected to at least one of the tracks.

4. The apparatus of claim 1 wherein the tonneau cover is secured to the decklid by a plurality of tracks which translate relative to each other and are parallel to the direction of movement of the tonneau cover.

5. The apparatus of claim 1 wherein the tonneau cover is secured to the decklid by a plurality of tracks, at least one of the tracks being connected to the decklid by a link.

6. The apparatus of claim 1 wherein the tonneau cover is secured to the truck lid by a plurality of tracks that are mounted below both the tonneau cover and the decklid, at least one of the tracks being pivotally connected to the decklid.

7. The apparatus of claim 1 further comprising a drive system for moving the tonneau cover.

8. The apparatus of claim 7 wherein the drive system includes a drive cable.

9. The apparatus of claim 1 further comprising an electric motor for moving the tonneau cover.

10. The apparatus of claim 1 wherein the decklid is pivotally attached to the vehicle.

11. Apparatus for covering a retractable top for a motor vehicle, comprising:
    a decklid pivotally attached to the vehicle, the decklid at least partially defining an opening through which the top may retract;
    a tonneau cover slidably secured to the decklid by a plurality of tracks which telescope relative to each other to open and close the opening.

12. The apparatus of claim 11 wherein the tonneau cover is pivotally connected to at least one of the tracks.

13. The apparatus of claim 11 wherein at least one of the tracks is connected to the decklid by a link.

14. The apparatus of claim 11 wherein at least one of the tracks is pivotally connected to the decklid.

15. The apparatus of claim 11 further comprising an electric motor operatively connected to the tonneau cover to move the tonneau cover.

16. Apparatus for covering a retractable top for a motor vehicle, comprising:
    a tonneau cover;
    a plurality of tracks connected to a decklid, the tonneau cover being slidable with at least one of the tracks wherein the tonneau may cover the top in a retracted position.

17. The apparatus of claim 16 wherein the tonneau cover is pivotally connected to at least one of the tracks.

18. The apparatus of claim 16 wherein at least one of the tracks is connected to the decklid by a link.

19. The apparatus of claim 16 wherein at least one of the tracks is pivotally connected to the decklid.

20. The apparatus of claim 16 further comprising an electric motor operatively connected to the tonneau cover to move the tonneau cover.

* * * * *